United States Patent
Bender et al.

(10) Patent No.: US 6,296,027 B1
(45) Date of Patent: Oct. 2, 2001

(54) FUEL ASSEMBLY FOR AN ENGINE WELDER

(75) Inventors: David J. Bender, Chardon; Donald R. Parmelee, Beachwood, both of OH (US)

(73) Assignee: Lincoln Global, Inc., Monterey Park, CA (US)

( * ) Notice: Subject to any disclaimer, the term of this patent is extended or adjusted under 35 U.S.C. 154(b) by 0 days.

(21) Appl. No.: 09/836,639

(22) Filed: Apr. 18, 2001

Related U.S. Application Data

(62) Division of application No. 09/550,739, filed on Apr. 17, 2000.

(51) Int. Cl.$^7$ .............................. B65B 1/04; B65B 3/04; B65C 3/02
(52) U.S. Cl. .............................. 141/86; 141/18; 141/390; 141/391; 219/133
(58) Field of Search .............................. 141/18, 86, 390, 141/391; 219/133, 134; 220/86.2, 601

(56) References Cited

U.S. PATENT DOCUMENTS

| | | |
|---|---|---|
| 2,177,687 | 10/1939 | Bracken et al. . |
| 4,465,920 | 8/1984 | Hoyt, Jr. et al. . |
| 4,595,841 | 6/1986 | Yaguchi . |
| 4,702,201 | 10/1987 | Odo et al. . |
| 4,703,867 | 11/1987 | Schoenhard . |
| 4,759,458 | 7/1988 | Fischer . |
| 4,768,566 | 9/1988 | Ito et al. . |
| 4,798,182 | 1/1989 | Ebinuma et al. . |
| 5,033,521 | 7/1991 | Martin . |
| 5,094,315 | 3/1992 | Taki et al. . |
| 5,127,432 | 7/1992 | Duhaime et al. . |
| 5,133,588 | 7/1992 | Hutchinson et al. . |
| 5,183,087 | 2/1993 | Aubel et al. . |
| 5,275,213 | 1/1994 | Perkins . |
| 5,320,147 | 6/1994 | Jamrog . |
| 5,344,038 | 9/1994 | Freeman et al. . |
| 5,385,178 | 1/1995 | Bedi . |
| 5,390,808 | 2/1995 | Choma et al. . |
| 5,437,317 | 8/1995 | Takatsuka et al. . |
| 5,590,806 | 1/1997 | Green et al. . |
| 5,662,149 | 9/1997 | Armellino . |
| 5,738,380 | 4/1998 | Zipser et al. . |
| 5,928,535 | 7/1999 | Trinkner et al. . |

FOREIGN PATENT DOCUMENTS 23 53 448   4/1975   (DE) .

OTHER PUBLICATIONS

Ranger™ 9 Operator's Manual May, 1995.
Miller® Onwer's Manual Oct. 1996.
Miller® Owner's Manual Sep. 1996.

*Primary Examiner*—Timothy L. Maust
(74) *Attorney, Agent, or Firm*—Vickers, Daniels & Young

(57) ABSTRACT

A fueling assembly for a fuel tank of an engine driven welder. The engine driven welder has a housing having a top portion, a side portion and a fueling cavity. The fueling cavity is formed in the top portion and the side portion of the engine welder housing. An engine and a fuel tank are located within the housing. The fueling assembly includes a filler tube, a fuel gauge and a grommet to seal the filler tube and fuel gauge in the fueling cavity. The fuel gauge has a fuel level indicator and a fuel level sensor that extends through the filler tube and into the fuel tank. The fuel level indicator registers a plurality of fuel levels in the fuel tank. The grommet is a one piece structure having a lower intermediate section which includes an opening to provide access to the filler tube opening and the fuel level indicator. The side section of the grommet has flanges to connect the grommet to the engine welder housing. The opening in the lower intermediate section of the grommet has a sealing structure which includes a flexible flap that engages the filler tube and the fuel level indicator to form a seal with the filler tube and the fuel level indicator. The sealing structure also has a filler cavity formed by a cavity wall that extends downwardly from the lower intermediate section opening and receives and forms a seal with the upper region of the filler tube. The grommet has a positioning stub secured to the posterior side of the lower intermediate section to position and secure the lower intermediate section front edge to the engine welder housing.

13 Claims, 7 Drawing Sheets

FUEL ASSEMBLY FOR AN ENGINE WELDER

This patent application is a division, of application Ser. No. 09/550,739 filed on Apr. 17, 2000, and incorporated herein by reference.

BACKGROUND OF THE INVENTION

This invention pertains to engine driven welding machines, and more particularly to arrangements for filling the fuel tanks for welding machine engines.

BACKGROUND OF THE INVENTION

Engine driven welding machines include a gas powered engine to run a generator which supplies power to the welding electrode. Consequently, the fuel tank for the gas powered engine must be periodically refilled with fuel. Historically, the gas tank opening for the engine welder was located at or near the base of the engine welding machine. This position of the gas tank opening of the welder had several disadvantages, one which was that an operator was required to bend down to the ground to open, fill and then reseal the gas tank. Another disadvantage was that the close proximity of the gas tank opening to the top of the gas tank provided little if any warning to the operator during fueling that the gas tank was approaching a fall condition, thus resulting in fuel spillage. One attempt to overcome the spillage problem was to use fuel gauges in the fuel tanks. Although the fuel gauges helped to reduce fuel spillage, the fuel gauges generally did not indicate the fuel level in the fuel tank quickly enough to prevent many fuel spillages. Another disadvantage to the fuel opening in the base of the engine welder was that the fuel tank opening was positioned on one side of the engine welder, thus requiring the engine welder to be positioned in a location that would not obstruct the fuel opening for later fueling of the engine welder. A further disadvantage was that instruction and/or warning labels positioned near the fuel opening which informed the operator about the type of fuel to use and/or the proper operation for fueling the engine welder were difficult to read since such instructions and/or warning labels were positioned at or near the base of the engine welder.

Several engine welders have been designed to overcome some of the problems associated with the positioning of the fuel tank opening at or near the base of the engine welder by including long filler tubes to the fuel tank, and by positioning the opening in the filling tube to allow for access to the opening from the top of the engine welder. The use of the longer filler tube provides additional fuel storage space to help reduce the number spills and the volume of fuel spillage. The positioning of the filler tube opening at the top of the engine welder allows for more versatile positioning of the engine welder. The use of the long filler tube also has several disadvantages. The long filler tube can have pressure build up in the filler tube during fueling which can result in fuel back flow and fuel spillage when the fuel flow into the fuel tank is suddenly stopped. The reduced diameter of the longer filler tube also can result is rapid filling of the filler tube with fuel after the fuel tank is filled thereby potentially causing high velocity fuel to move up the filler tube during the filling of the fuel tank resulting in spraying and spillage. Another disadvantage is that filler tube openings extending above the top of the engine welder detract from the aesthetics of the engine welder. In addition the portion of the filler tube extending above the top surface of the engine welder was susceptible to damage from being struck from objects positioned near the top of the engine welder as the engine welder was moved to various locations. The filler tube opening in the top of the engine welder also caused spilled fuel to spill on the top of the engine welder resulting in the spilled fuel to flowing into the interior of the engine welder and on multiple sides of the engine welder thereby requiring extensive cleanup prior to again operating the engine in the engine welder.

Several designs have been suggested to reduce the problems with spillage on the top of the engine welder. These designs have included the use of enlarged regions or chambers about the filler tube opening designed to temporarily store fuel that exits the filler tube opening. However, these design still do not overcome the problem of fuel spillage when the fuel overflows the chamber nor the problems associated with damage to the portion of the filler tube that protrudes above the top of the engine welder.

A recent improvement to fuel tank designs for engine welders is shown in U.S. Pat. No. 5,928,535. A portion of the top and adjacent side of the engine welder is cutout and a grommet is positioned in the cutout region to reseal the top and side of the engine welder. The opening of the filler tube extends through the bottom of the grommet and to a position that is below the top of the engine welder. The filler tube includes an expansion space to reduce splashback and spillover during the fueling of the fuel tank. This fuel tank design overcomes many of the problems associated with past fuel tank designs for engine welders. Damage to the recessed filler tube opening is minimized by this design. The cavity of the grommet directs spilled fuel to one side of the engine welder for easier cleanup of spills. The design of the filler tube also reduces splashback and spillover during the fueling. However, several disadvantages still exist in this fuel tank design. During operation of the engine welder, the components of the engine welder vibrate. As a result of these vibrations, the filler tube moves in the opening of the grommet. As a result of such movement, the seal between the filler tube and the grommet becomes worn and compromised thereby allowing fuel that spills out of the filler tube opening to enter the interior of the engine welder housing. In addition, periodic servicing of the engine welder can include the removal and cleaning or replacement of the grommet. When the cleaned grommet or replacement grommet is replaced back into position, the bottom of the grommet must form a seal about the cutout side of the engine welder and the filling tube opening to prevent fuel from leaking into the interior of the engine welder when a spill occurs. The design of the grommet makes it difficult to form such a seal when the grommet is repositioned on the engine welder. The modified filler tube design also has several disadvantages. The enlarged region of the filler tube requires additional space in the interior of the engine welder. Such space requirements can complicate the interior design of the engine welder and make it inconvenient to service the interior of the engine welder. The filler tube design also does not inform an operator when the gas tank is about to be filled. The enlarged region of the filler tube is deigned to provide additional time for an automatic fuel cutoff to activate before the fuel overflows. However, if the automatic fuel cutoff malfunctions or is too slow to respond, fuel spillage still occurs.

In view of the deficiencies of the present fuel tank designs, there is a need for a fuel tank design for an engine spreader that will significantly minimize the incidents of splashback and spillover during the fueling of the engine welder, is easy to service, facilitates in proper sealing and minimizes or prevents fuel from contaminating the interior of the engine welder when a fuel spill occurs.

SUMMARY OF THE INVENTION

The present invention relates to an fuel tank design for an engine welder, and more particularly, to an improved grommet for the filler tube opening and an improved fuel level monitoring arrangement; however, the invention is not limit to engine welders and can be used in all types of mechanisms that include a gas powered engine.

In accordance with a principal aspect of the present invention, an engine driven welder is provided which includes a housing to protect the internal components of the welder. Protected by the housing is a fuel powered engine and an electric generator. The fuel powered engine runs the electric generator which in turn produces electricity for the arc welder. The electric generator is selected to produce electricity for various types of welders, such as TIG welders, plasma arc welders, MIG welders, STT welders, and the like. Electric circuitry can be included within the housing to control the amount of current, voltage, power and/or the wave form of current directed to the electrode of the welder. A gasoline tank is provided within the housing to supply fuel to the fuel powered motor. The fuel tank can be positioned in various areas within the housing, but is preferably positioned at or near the base of the housing or engine welder. A filler tube is connected to a portion of the gasoline tank and extends upwardly from the gasoline tank and through a portion of the housing to enable an operator to refill the fuel tank. The filler tube and fuel tank can be made from one or multiple pieces of material. The filler tube and fuel tank are made of a durable material such as plastic and/or a metal material. The Engine welder includes a control panel to operate various internal components of the welder and to provide connectors to various components of the welder. A fixed or adjustable exhaust pipe for the fuel power engine is also included on the engine powered welder. These and other standard components of an engine driven welder are disclosed in U.S. Pat. No. 5,928,535, which is incorporated herein by reference. The engine welders is preferably transported by a welding carriage. One particular welding carriage which can be used is disclosed in Assignee's U.S. patent application Ser. No. 09/411,106, filed Oct. 4, 1999, which is incorporated herein by reference. The filler tube and fuel tank arrangement include a fuel gauge to monitor the fuel level in the filler tube and/or fuel tank. The fuel gauge enables an operator to monitor fuel levels within the filler tube and/or fuel tank to enable an operator to anticipate when the engine welder needs to be refueled and/or to notify an operator during the refueling process of the fuel tank when the fuel tank is filled, thereby avoiding spillage and waste of fuel. In one embodiment, the fuel gauge is designed to notify an operator during the refueling process the fuel level within the fuel tank and/or filler tube to enable an operator to cease the fueling operation prior to fuel back flowing and/or spilling out of the opening in the filler tube. The minimizing of spillage reduces damage to the welder and/or components about the welder, and the time and money required for clean-up of the spilled fuel. In another embodiment, the fuel gauge is designed to monitor the fuel level within the fuel tank to inform an operator of the current fuel level within the fuel tank. In this particular embodiment, a portion of the fuel gauge extends into the fuel tank to allow for fuel level monitoring within the fuel tank. In still another embodiment, the fuel gauge includes a fuel level indicator that registers at least one fuel level and preferably multiple fuel levels within the fuel tank. In still yet another embodiment, the fuel gauge includes a fuel level indicator and a fuel level sensor assembly which fuel level sensor assembly at least partially extends the length of the filler tube. In a further embodiment, the fuel level sensor incorporates mechanical, electrical and/or chemical schemes to sense the fuel level. In one aspect of this embodiment, the fuel level sensor incorporates a mechanical float to at least partially sense a fuel level.

In accordance with another aspect of the present invention, a fueling cavity is positioned in a top portion of the housing and is designed to provide access to the filler tube opening and at least the fuel level indicator of the fuel gauge when a fuel gauge is used. In one embodiment, the base of the fueling cavity is recessed from the top portion of the engine welder housing. In another embodiment, a portion of the fueling cavity is recessed from at least one side portion of the housing of the engine welder. In still another embodiment, the fueling cavity is positioned on a top side edge of the engine welder housing and forms a recessed cavity from both the top and side portion of the housing. In still yet another embodiment, the filler tube opening extends at least to and preferably to a point above the base of the fueling cavity. In accordance with a specific aspect of this embodiment, a top portion of the filler tube extends from the interior of the housing, through the base of the filler cavity and to a point such that the filler tube opening is level with or positioned at some point below the top portion of the housing of the engine welder. In accordance with another specific aspect of this embodiment, the fuel level indicator of the fuel gauge is positioned at a point that is flush with, or above, the base of the fueling cavity. In accordance with still another specific aspect of this embodiment, the top portion of the fuel gauge extends upward from the interior of the engine welder through the base of the fueling cavity. In a further embodiment, the fuel level indicator is positioned at or near the base of the fueling cavity. In accordance with a specific aspect of this embodiment, the fuel level indicator is positioned at a level below the position of the filler tube opening. In accordance with another specific aspect of this embodiment, the fuel level indicator is positioned in the fueling cavity in a manner such that the fuel level indicator is positioned closer to the side portion of the housing than the filler tube opening. In accordance with still another aspect of this embodiment, the fuel level indicator is spaced from the side portion of the housing.

In accordance with still another aspect of the present invention, the filler tube has a variable cross-sectional area along the length of the filler tube to accommodate a fuel gauge positioned at least partially within the filler tube. The filler tube includes a top portion and a bottom portion. The bottom portion may be uniformly formed with the fuel tank or sealed to the fuel tank by welding, bolting, and the like. The cross-sectional area of the filler tube is sufficiently large to accommodate a fuel level sensor assembly that is at least partially positioned within the interior of the filler tube. The fuel level sensor assembly may partially extend or fully extend through the length of the filler tube. The fuel level sensor assembly may measure the fuel level within the fuel tank and or filler tube by a mechanical, chemical and/or electrical sensing arrangement. The top portion of the filler tube is designed to accommodate both the filler tube opening and a portion of the fuel gauge. In one embodiment, the top portion of the filler tube widens to enable the fuel level indicator to be mounted to the top surface of the top portion of the filler tube and to accommodate the neck of the filler tube opening. In accordance with a specific aspect of this embodiment, the cross-sectional area of the filler tube does not substantially increase from the neck of the filler tube opening to the point where the fuel gauge is positioned within the filler tube. In another embodiment, the filler tube opening includes a removable cap to enable an operator to open and close the filler tube opening. In a specific aspect of this embodiment, the cap allows fumes to escape through the cap when the pressure within the filler tube exceeds a predetermined pressure. This design of the filler tube opening cap ensures that high pressures do not build up within the filler tube and/or fuel tank. In accordance with still another embodiment, the filler tube is configured to clear the components inside the housing of the welding machine.

In accordance with yet another aspect of the present invention, a grommet is provided to be inserted in the fueling cavity of the housing. The grommet is designed to at least partially seal the region about the fueling cavity to inhibit and/or prevent fluids from entering the interior of the housing of the welding machine. In one embodiment, the grommet defines at least one portion of the fueling cavity. In one specific aspect of this embodiment, a portion of the housing of the engine welder is cut out and the grommet is inserted into this cut-out portion of the housing. In this arrangement, the edges of the cut-out housing and at least a part of the posterior surface of the grommet define the fueling cavity. In another embodiment, the grommet is a one piece structure which includes a side section and a lower intermediate section. In one specific aspect of this embodiment, the side section is formed into a arcuant shape such as a U-shaped portion. In another specific aspect of this embodiment, the side section includes a curved base portion to form a sloping transition between the side section and lower intermediate section of the grommet. In yet another specific aspect of this embodiment, the lower intermediate section of the grommet includes a curved portion which has a radius of curves similar to the radius of curvature of the base portion of the side section so as to form a substantially uniform sloped surface between the side section and lower intermediate section of the one-piece grommet. As can be appreciated, the side section and/or lower intermediate section can have a variety of other shapes so as to accommodate the shape of the fueling cavity. The grommet can be made up of a variety of materials to satisfy the durability needs and versatility needs of the grommet. In still another embodiment, the grommet is made of a single material that is flexible and resists degrigation by petroleum products. In one specific aspect of this embodiment, the grommet is made of rubber, plastic and/or various types of composite materials. In yet another embodiment, the lower intermediate section of the grommet includes an opening which provides access to a portion of the filler tube. In one specific aspect of this embodiment, the filler tube opening extends at least to, and preferably above, the opening in the lower intermediate section of the grommet. In another specific aspect of this embodiment, the lower intermediate section includes an opening of sufficient size to provide access to both the filler tube opening and a portion of the fuel gauge to enable an operator access to both the filler tube opening and a portion of the fuel gauge.

In accordance with still yet another aspect of the present invention, the grommet includes outwardly extending flanges which are connected to the top and front edges of the side section of the grommet. The flanges are designed to form a seal at least partially about the perimeter of the fueling cavity to inhibit or prevent fluids from inadvertently entering the interior of the housing of the engine welder. In one embodiment, the flanges include one or more openings to secure the flanges to the housing of the engine welder. In one specific aspect of this embodiment, the flanges are secured to the top surface of the engine welder housing. In another specific aspect of this embodiment, the flanges are secured to the underside surface of the engine welder housing. In yet another specific aspect of the embodiment, a portion of the flange is secured to the top side of the housing and a portion of the flanges secured to the underside of the housing. In another embodiment, screws, bolts, clips, adhesives, tongue and groove arrangements, snaps and/or slots or similar arrangements are used to secure the flange to the engine welder housing.

In accordance with a further aspect of the present invention, the grommet includes a sealing structure which is positioned in the opening of the lower intermediate section of the grommet. The sealing structure is designed to form a seal about the filler tube portion that is positioned even with or above the opening in the grommet. When a fuel gauge is used, the sealing structure also forms a seal about a portion of the fuel gauge which extends even with or above the opening in the lower intermediate section of the grommet. The sealing structure is designed to inhibit or prevent fluids, which spill from the filler tube or are spilled onto the grommet during refueling, from seeping into the opening in the lower intermediate section of the grommet. In one embodiment, the sealing structure includes a flexible flap which engages a portion of the filler tube and a portion of the fuel gauge, if used, when the grommet is positioned in the fueling cavity. In one specific aspect of this embodiment, the flexible flap slops upwardly from the opening in the lower intermediate section of the grommet. This upward sloping arrangement helps to ensure that a proper seal is formed about a portion of the filler tube and, if used, a portion of the fuel gauge when the grommet is inserted into the fueling cavity. In another specific aspect of this embodiment, the opening through this flexible flap is smaller than the portion of the filler tube engaging the flap, and if used, smaller than the portion of the filler tube and portion of the fuel gauge engaging the flap. The smaller opening causes the flap to stretch and/or bend about the surface of the filler tube or filler tube and fuel gauge to form a tight fit and seal. In still another specific embodiment, the flexible flap is spaced above the opening in the lower intermediate section of the grommet. In still another embodiment, the sealing structure includes a filler cavity which extends downwardly from the opening in the lower intermediate section of the grommet. The cavity wall of the filler cavity forms a cavity designed to be inserted about a portion of the top portion of the filler tube. In one specific aspect of this embodiment, the size and shape of the filler cavity closely matches the size and shape of the top portion of the filler tube so as to form a secure fit and seal between the cavity wall and the top portion of the filler tube. The seal formed between the cavity wall and the top portion of the filler tube facilitates in inhibiting or preventing fluids from entering the interior of the housing of the engine welder. The size and shape of the filler cavity also ensures that the grommet is properly positioned about the top portion of the filler tube and properly positioned in the fueling cavity. The filler cavity also facilitates in securing the grommet to the top portion of the filler tube so as to inhibit or prevent the movement of the grommet about the filler tube which could result in the quality of the seal being reduced or broken during operation of the engine welder. In yet another embodiment, at least a portion of the cavity wall extends about the posterior surface of the lower intermediate section of the grommet In a further embodiment, at least a portion of the cavity wall extends to and connects with at least a portion of the flexible flap. In still a further embodiment, the cavity wall extend above the opening in the intermediate section of the grommet and the flexible flap is secured to the upper portion of the cavity wall. In still a further embodiment, the cavity wall of the filler cavity includes at least one support rib to increase the rigidity of the cavity wall. Preferably a plurality of support ribs are positioned about the perimeter of the outer perimeter of the cavity wall. In one specific aspect of this embodiment, at least one support rib extends the complete vertical length of the cavity wall that extends downward from the posterior surface of the lower intermediate section of the grommet.

In accordance with a further aspect of the present invention, the grommet has a positioning stub on the posterior side of the lower intermediate section. The positioning stub is designed to be inserted into an opening in a flange which extends inwardly from the housing of the engine welder. The positioning stub is designed to ensure that the grommet is properly positioned in the fueling cavity. The positioning stub also reduces movement of the grommet within the fueling cavity which could compromise the sealing of the grommet in the fueling cavity. In one embodiment, the positioning stub is positioned near, but spaced from, the front edge of the lower intermediate section. In one specific design, an inwardly extending flange from the side portion of the housing includes an opening for the positioning stub to be inserted therein.

In accordance with yet a further aspect of the present invention, the top surface of the lower intermediate section of the grommet slopes downwardly toward the front edge of the lower intermediate section. The downward slope of the lower intermediate section causes fluids which pill into the grommet to flow out of the grommet so that stagnate fluids do not remain in the grommet.

The principal object of the present invention is to provide a fueling assembly which minimizes the incidents of splash back and spill over during fueling.

Another object of the present invention is to provide a fueling assembly which is easy to service and install.

Yet another object of the present invention is to provide a fueling assembly having proper sealing and which minimizes or prevents fluids from contaminating the interior of the engine welder when a fuel spill occurs.

Still another object of the present invention is to provide a fueling assembly which minimizes damage to the fueling assembly components during the operation of the engine welder.

Still yet another object of the present invention is to provide a fueling assembly which includes a fuel gauge to monitor fuel levels to thereby reduce or prevent spillage.

A further object of the present invention is to provide a fueling assembly which includes a fuel gauge having a fuel indicator that registers a plurality of fuel levels within the fuel tank of the fuel assembly.

Another object of the present invention is to provide a fuel assembly which includes a grommet that forms a fluid seal in a fueling cavity of an engine welder.

In yet another object of the present invention is to provide a fuel assembly which includes a one-piece grommet that can be connected to the top and/or bottom of the housing of the engine welder.

Still another object of the present invention is to provide a fuel assembly which includes a grommet having a flexible flap which forms a seal with components of the fueling assembly that protrude through the lower intermediate section of the grommet.

In accordance with still yet another object of the present invention is to provide a fueling assembly which includes a grommet having a filler cavity that engages a top portion of a filler tube to maintain the position of the grommet about the filler tube and/or to form a seal between the grommet and the filler tube.

A further object of the present invention is to provide a grommet having reinforcement ribs positioned on the walls of the filler cavity to provide rigidity and/or structural support to the cavity walls of the filler cavity.

Still a further object of the present invention is to provide a grommet having a lower intermediate section which downwardly slopes toward the side of the housing of the engine welder when the grommet is positioned and secured in the engine welder.

Another object of the present invention is to provide a fueling assembly which includes a grommet having a positioning stub to position a portion of the grommet in the fueling cavity and/or to maintain in position the grommet in the fueling cavity.

These and other objects and advantages of the invention will become apparent to those skilled in the art upon reading and following this description taken together with the accompanying drawings.

BRIEF DESCRIPTION OF THE DRAWINGS

Reference may now be made to the drawings which illustrate various embodiments that the invention may take in physical form and certain parts and arrangements of parts wherein.

Figure 3:
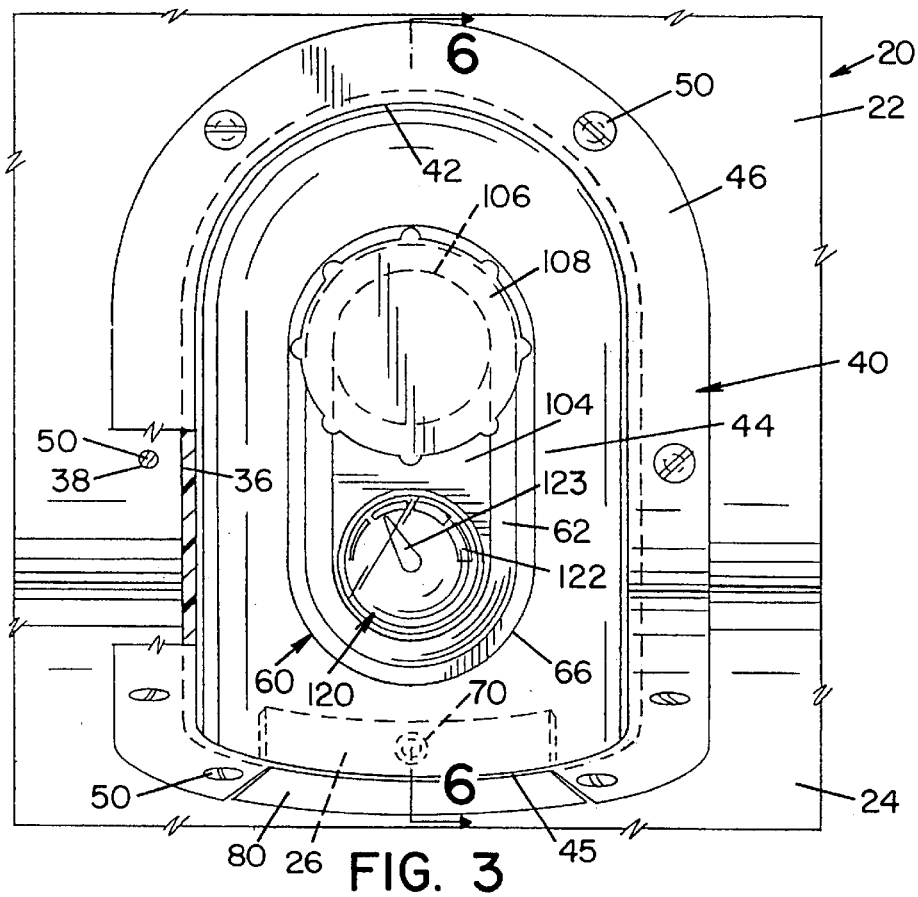
FIG. 3 is an enlarged plan view of the grommet mounted in the fueling cavity as illustrated in FIG. 1.
Figure 4:
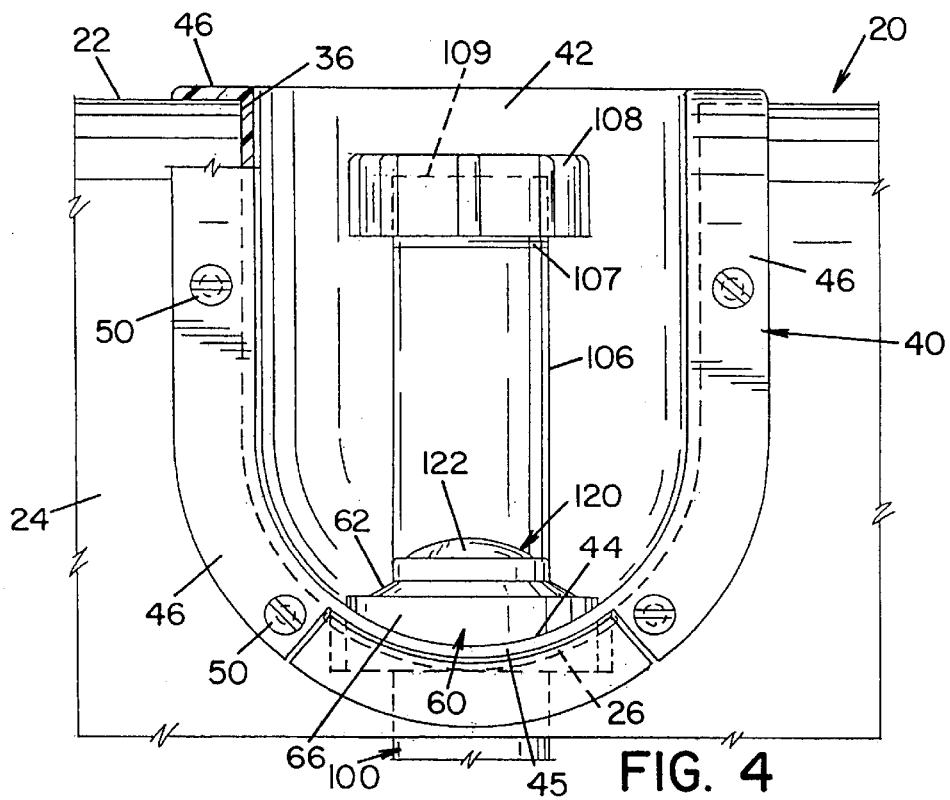
FIG. 4 is an enlarged front end elevation view of the grommet mounted in the fueling cavity as illustrated in FIG. 1.
Figure 6:
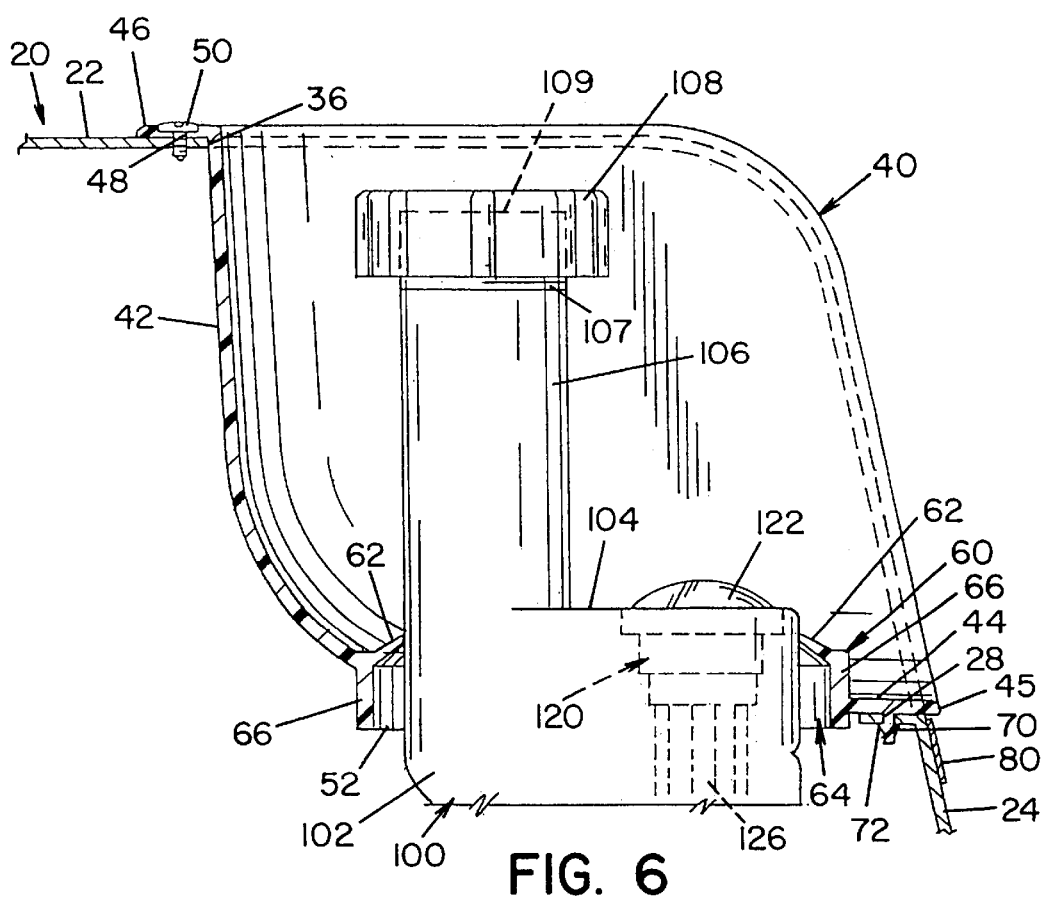
Figure 7:
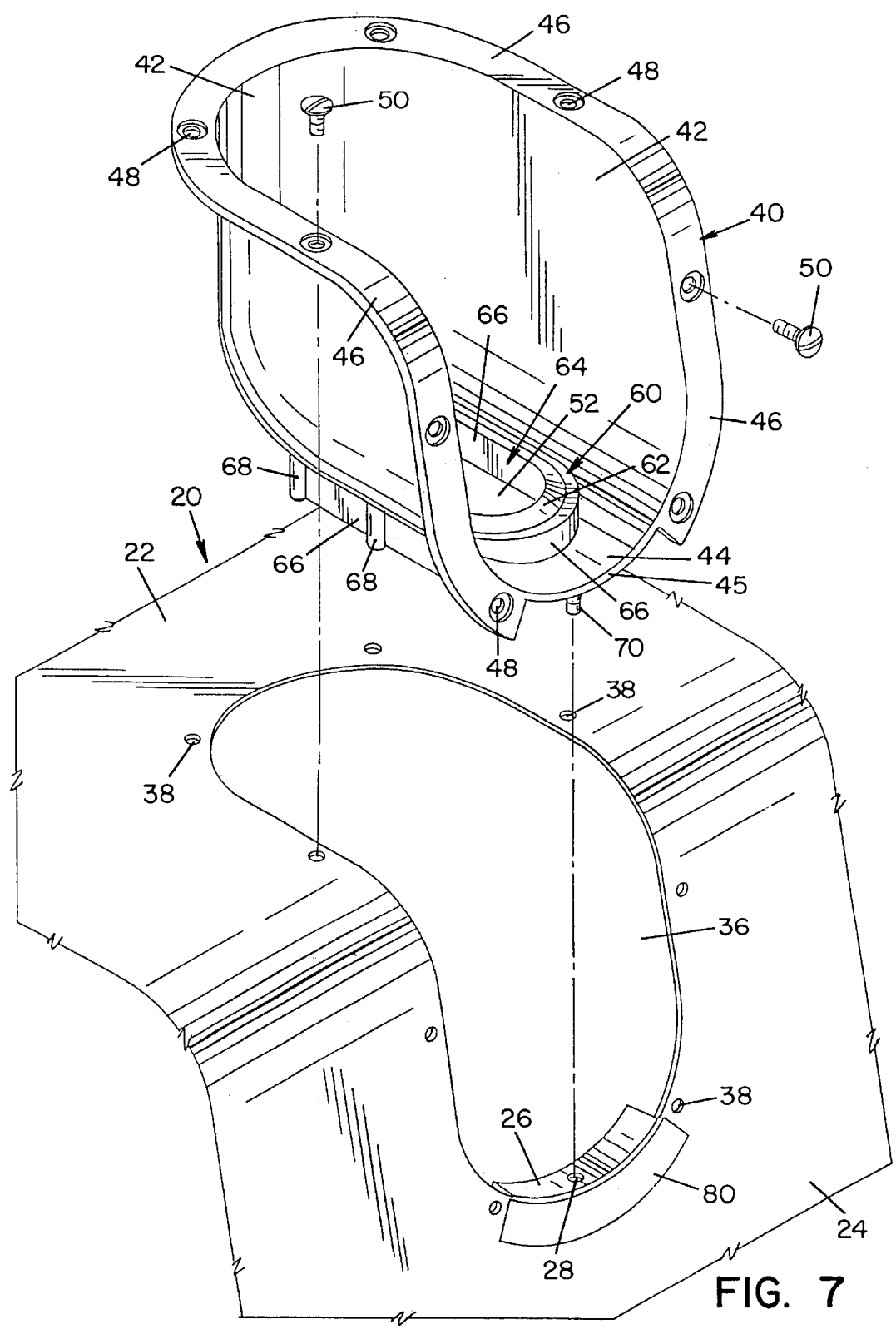
Figure 8:
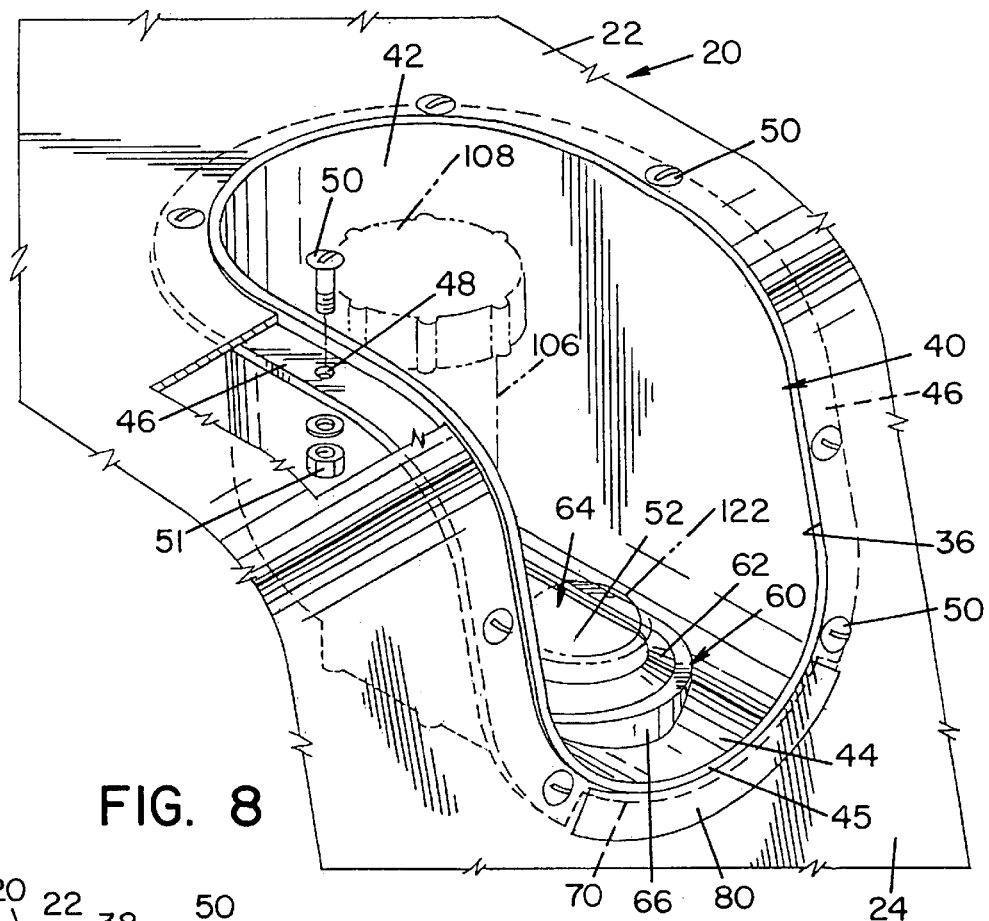
Figure 9:
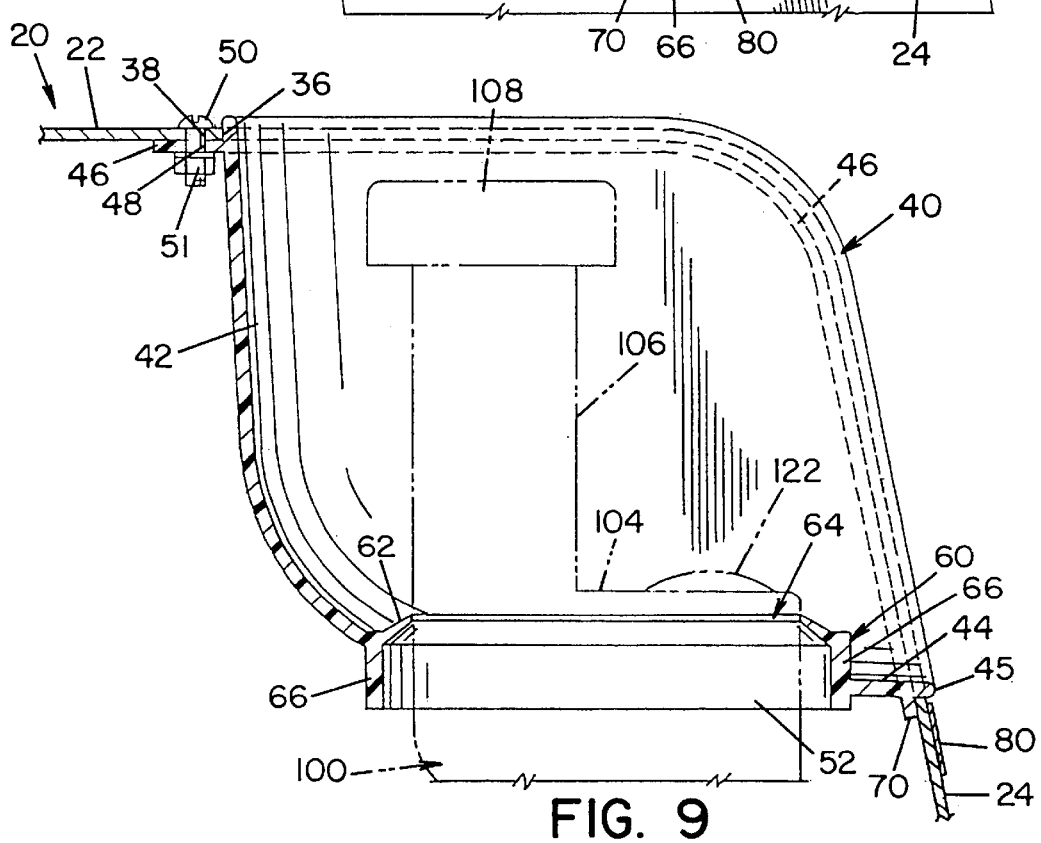
Figure 10:
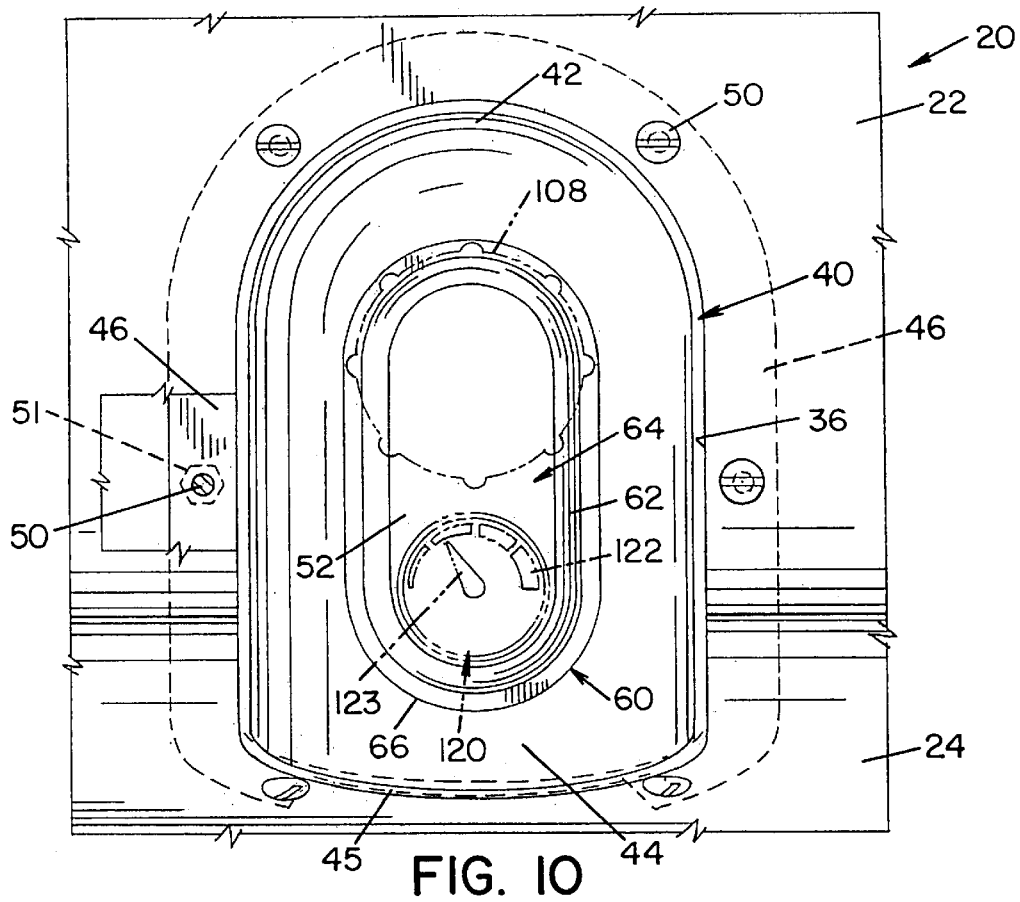

FIG, 5 is a side elevation view of the grommet in accordance with the present invention;

FIG. 6 is a cross-sectional view taken along line 6—6 of FIG. 3;

FIG. 7 is an exploded perspective view of the grommet and the fueling cavity in the housing of the engine welder;

FIG. 8 illustrates a perspective view of the grommet mounted to the underside of the housing of the engine welder;

FIG. 9 is a cross-sectional view of the grommet as illustrated in FIG. 8;

FIG. 10 is a plan view of the grommet as illustrated in FIG. 8; and

Figure 11:
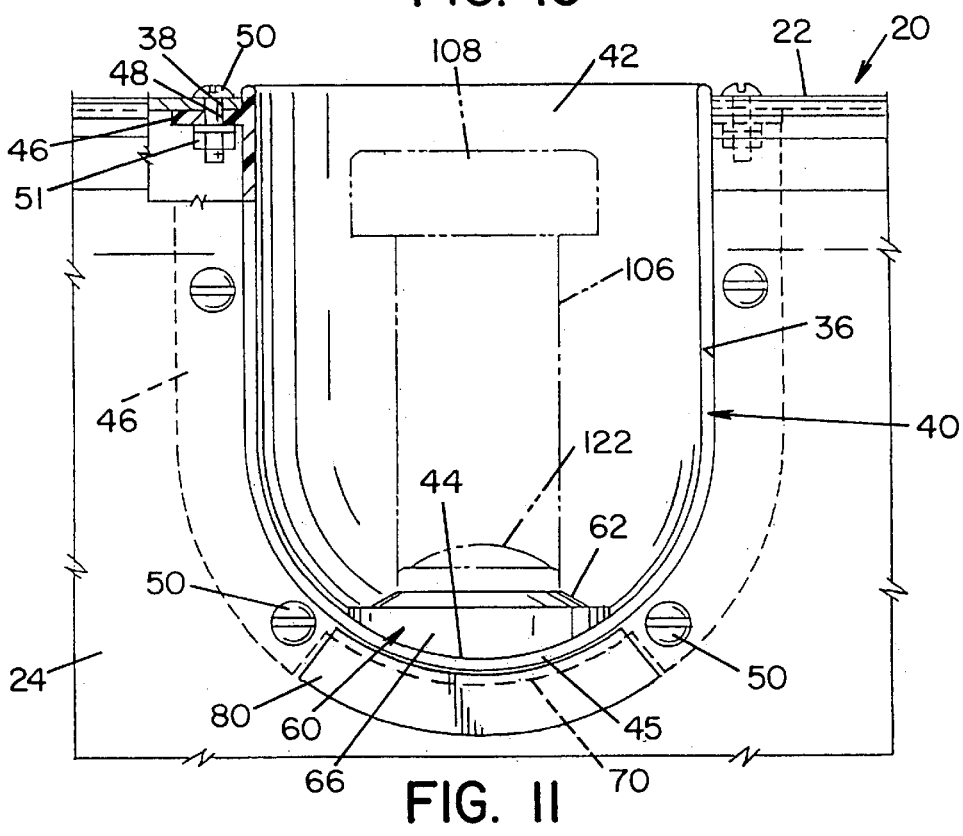

FIG. 11 is a front elevation view of the grommet as illustrated in FIG. 8.

DETAILED DESCRIPTION OF THE EMBODIMENTS

Figure 1:
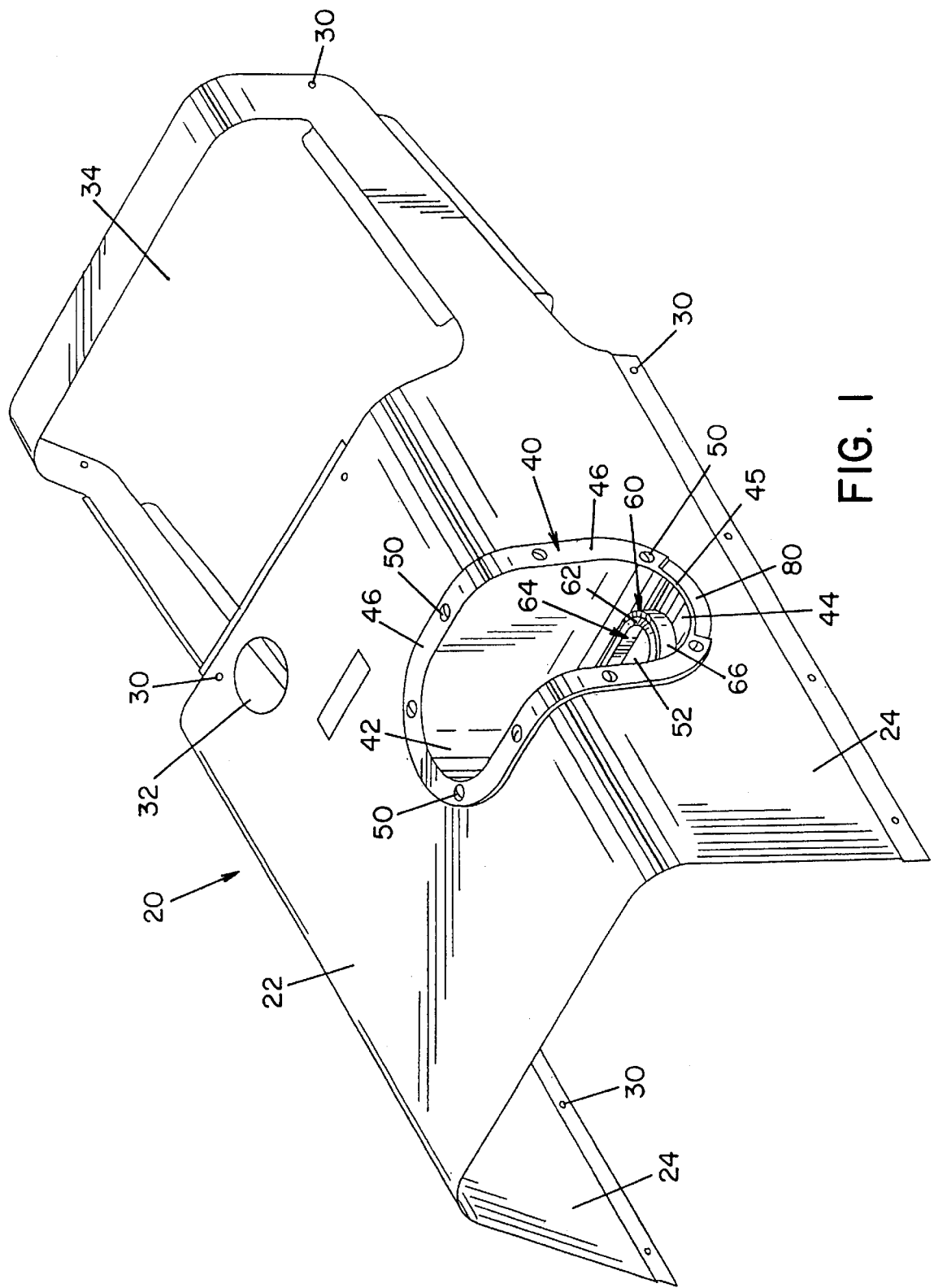
FIG. 1 is a perpective view of the housing of an engine welder showing the grommet in accordance with the present invention secured in the fueling cavity of the housing.

Referring now to the drawings, wherein the showings are for the purposes of illustrating the preferred embodiments of the invention only and not for the purpose of limiting the same, FIG. 1 illustrates a welding housing 20 which is secured to a typical engine welder not shown; Welding housing 20 includes a top portion 22 and two side portions 24. The welding housing is designed to encase at least a portion of the internal components of the engine welder. Positioned in top portion 22 of welding housing 20 is an exhaust pipe opening 32 and a motor access opening 34. Several mount holes 30 are positioned about the welding housing to enable the welding housing to be secured to the frame of the engine welder.

Positioned in the top and side portion of the welding housing 20 is a grommet 40. Grommet 40 is positioned in the fueling cavity 36 of the welding housing 20. Fueling cavity 36 is formed by a cut-out section of the top section and side portion of the welding housing. As shown in FIG. 1, grommet 40 is inserted into fueling cavity 36 and seals the fueling cavity to inhibit or prevent fluids from entering the interior of the welding housing.

Referring now to FIGS. 3–11, grommet 40 is a one-piece structure made of a flexible material such as rubber. Grommet 40 includes a side section 42 and a lower intermediate section 44. Connected to the edge of side section 42 is a side flange 46 which extends outwardly from side section 42. Several flange openings 48 are positioned on flange 46 to enable grommet 40 to be secured to welding housing 20 by bolts 50. As best show in FIG. 7, side section 42 is U shaped and has a substantially linear upper portion and a curved base portion.

Lower intermediate section 44 is shown to have a curved portion which has a radius of curvature that is substantially the same as the radius of curvature of the base portion of the side section of the grommet 40. Positioned in the lower intermediate section is a opening 52. Opening 52 allows various components of the fueling arrangement of the engine welder to be inserted therethrough.

Figure 5:
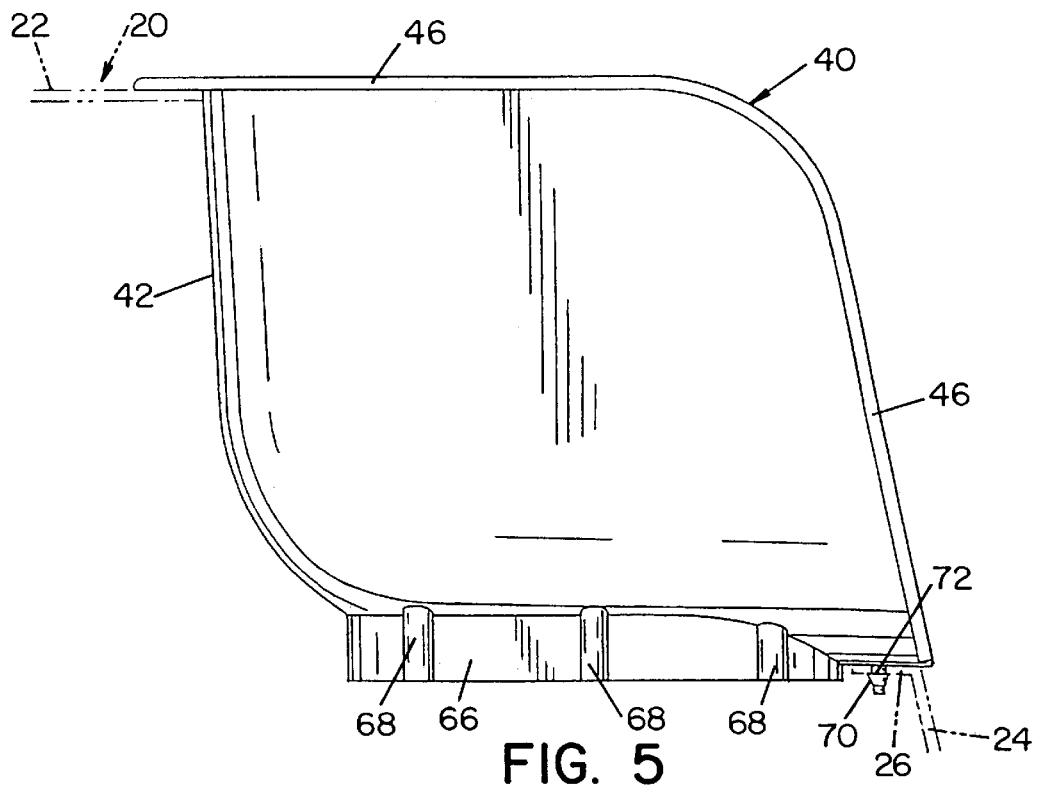

Positioned in opening 52 is a sealing structure 60. Sealing structure 60 includes a flexible seal flap 62 and a cavity wall 66 which extends downwardly from the base of the seal flap and through opening 52 to form a filling cavity 64. As best shown in FIGS. 5 and 7, filling cavity 64 at least partially extends to a point below the posterior side of lower intermediate section 44. Cavity wall 66 is also shown to extend at least partially above opening 52. Positioned on the outer surface of cavity wall 66 which extends downwardly from the posterior side of the lower intermediate section 44 are several ribs 68. These ribs 68 extend from the posterior side of lower intermediate section 44 toward and preferably to the base of cavity wall 66. Ribs 68 provide structural support and rigidity to cavity wall 66. As can be appreciated, ribs 68 can be positioned on cavity wall 66 that extends upwardly from opening 52. Preferably, the thickness of cavity wall 66 is greater than the thickness of seal flap 62 resulting in seal flap 62 having a greater flexibility than cavity wall 66. Also, as best shown in FIGS. 5 and 7 is a stub 70 which extends downwardly from the posterior side of lower intermediate section 44. As shown in FIG. 7, stub 70 is designed to be positioned in a flange hole 28 of flange 26, which flange extends inwardly from side portion 24 of welding housing 20. Stub 70 includes a lock ledge 72 to secure stub 70 in flange hole 28.

As previously stated, flange 46 includes a plurality of flange openings 48 which are used to secure grommet 40 to welding housing 20. As shown in FIGS. 3, 4, 6 and 7, side flange 46 is positioned on the top surface of top portion 22 and the top surface of side portion 24 of welding housing 20 when grommet 40 is secured to the welding housing 20. Bolts 50 are inserted through flange openings 48 and into grommet openings 38 in welding housing 20 thereby securing the grommet 40 to the welding housing 20. The flange 46, when bolted to the welding housing 20, forms a seal about the edge of the fueling cavity 36 to inhibit or prevent fluids from seeping past the fueling cavity edge and into the interior of the welding housing 20. Stub 70 which is secured into flange hole 28 helps to ensure that the front edge 45 of lower intermediate section 44 is secured to the bottom edge of the fueling cavity 36 to form a proper seal to inhibit or prevent fluids from entering the interior of the welding housing 20.

As best shown in FIG. 7, lower intermediate section 44 does not have a flange connected to front edge 45. The absence of the flange enables a manufacturer to insert a instruction label or informative label 80 closely adjacent to the fueling cavity 36. As shown in FIG. 7, label 80 has a similar shape to the bottom edge of fueling cavity 36. The shape is purely for asthetic purposes and the label can have any desired shape.

Referring now to FIGS. 8–11, an alternative embodiment of grommet 40 is shown. In this embodiment, grommet 40 is secured to the underside of welding housing 20. The components of welding grommet 40 are the same as the welding grommet illustrated in FIG. 7. As best shown in FIGS. 8 and 9, bolt 50 is inserted through opening 38 in the welding housing 20 and then inserted through flange openings 48. A nut 51 is secured through the threaded end of bolt 50 thereby securing grommet 40 to welding housing 20. As can be appreciated, other types of connectors such as threaded screws, clips or the like can be substituted for bolts 50 to secure side flange 46 to the underside surface or top surface of welding housing 20.

A further alternative embodiment of the invention is illustrated in FIG. 9. As shown in FIG. 9, stub 70 is positioned flush with the interior edge of side portion 24. In this embodiment, inwardly extending flange 26 is not used and the seal about the bottom edge of fueling cavity 36 is formed by the underside front edge of lower intermediate section 44. Stub 70 functions as a positioning stub facilitated in the proper positioning of the grommet 40 in fueling cavity 36. In a modification of this embodiment, stub 70 extends along the full length of the underside of lower intermediate section 44 to form a additional seal with the back side of side portion 44 to provide additional sealing when the grommet 40 is secured to welding housing 20.

When grommet 40 is secured in fueling cavity 36, lower intermediate section 44 slopes downwardly toward side portion 24 of housing 20. The slope surface causes fluids, which spill into the grommet, to flow out of the grommet over the front edge 45 of lower intermediate section 44 and down the outer surface of side portion 24 of housing 20. The slopes surface facilitates in removing fluids from the grommet and to direct spills to a single, controlled location.

Figure 2:
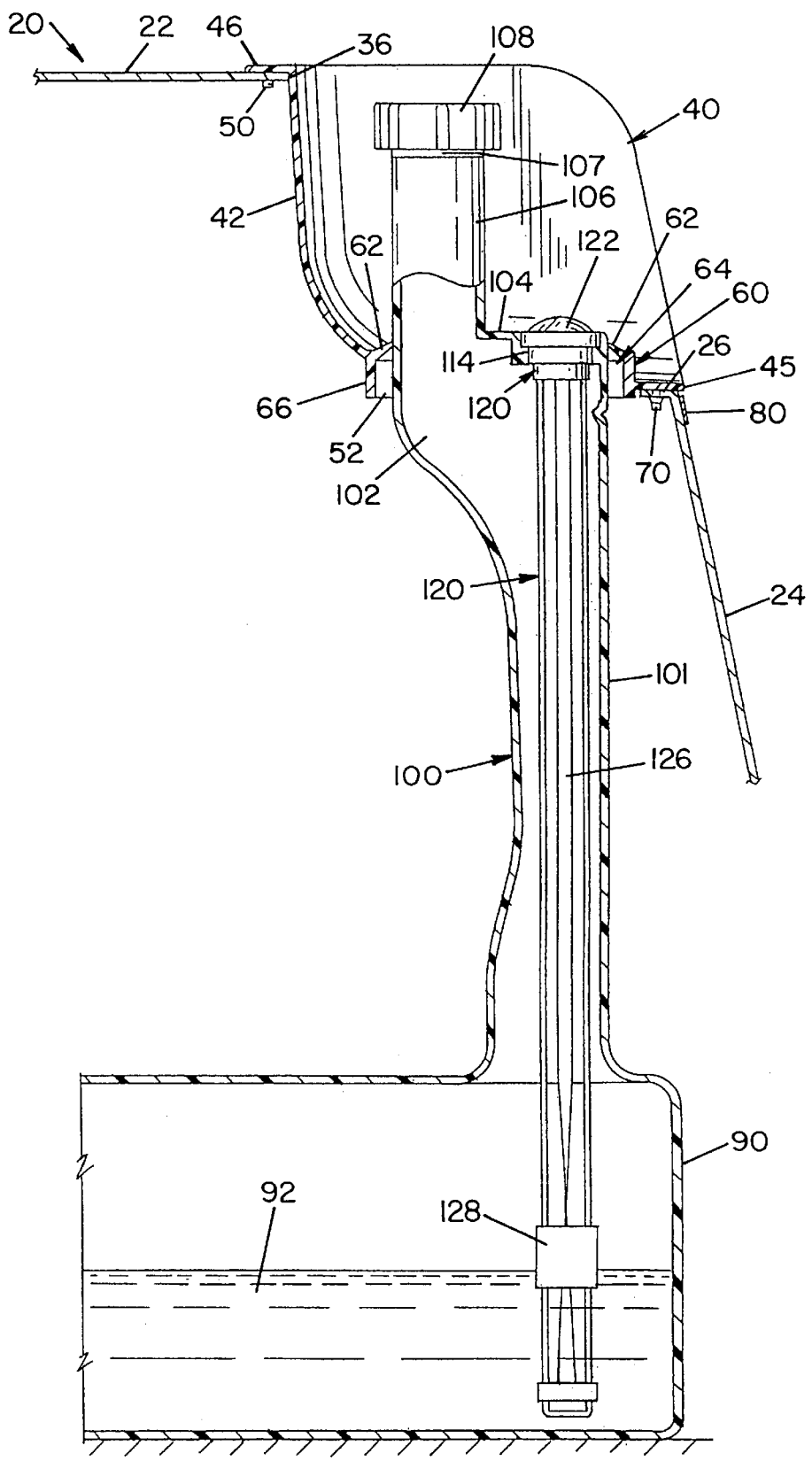
FIG. 2 is an enlarged sectional view of the filler tube and fuel tank of the engine welder showing a fuel gauge mounted in the filler tube and fuel tank in accordance with the present invention.

Referring now to FIG. 2, a fuel tank 90 is positioned and secured into the base of the engine welder. Fuel tank 90 supplies fuel to the fuel powered motor, not shown, in the engine welder. Formed on the top portion of fuel tank 90 is a filler tube 100 which extends upwardly from fuel tank 90 and to fueling cavity 36 in welding housing 20. Filler tube 100 includes side walls 101. The side walls 101 are formed in such a manner to be positioned about the internal components within the engine welder. Filler tube 100 and fuel tank 90 are shown to be made of a one-piece material. Top portion 102 of filler tube 100 includes a top landing 104. Positioned in flat top landing 104 is an opening extension 106 which extends upwardly from top landing 104 and terminates in opening 109. Secured to opening 109 is a opening cap 108 which is secured to the top of the opening by threads 107. Opening cap 108 is removed when fuel is to be added to fuel tank 90 and resealed onto opening 109 once fueling has been completed. Top landing 104 also includes a gauge opening 114 which is designed to receive and secure a portion of the fuel gauge 120 to top portion 102 of filler tube 100. Fuel gauge 120 includes a level indicator 122 which extends upwardly from top landing 104 and a gauge sensor 126 which is secured to the base of fuel level indicator 122 and extends downwardly through filler tube 100 and into fuel tank 90. Connected near the base of gauge sensor 126 is a fuel level float 128. Float 128 is designed to float in fuel 92 within tank 90 and the positioning of float 128 on gauge sensor 126 provides fuel level information which is indicated by pointer 123 in level indicator 122. During a fueling operation, an operator is able to monitor the fuel level indicator on fuel gauge 120 to determine when fuel tank 90 is filled. Once the level indicator 122 indicates that fuel tank 90 is filled, the operator ceases the fueling operation to prevent fuel from filling the filler tube and spilling out through opening 109. Fuel level indicator 122 also provides the operator with information on the amount of fuel left in fuel tank 90 to provide the operator information to determine whether a particular welding operation should be started and completed prior to the fuel in the fuel tank and exhausted. If an operator determines that the welding operation will take more time than the amount of fuel in the fuel tank can provide to run the engine, the operator can re-fill the fuel tank prior to operation so that a welding operation does not have to be prematurely terminated and restarted due to the engine welder running out of fuel.

Referring now to FIGS. 2, 3, 4 and 6–9, top portion 102 of filler tube 100 extends through ledge 100 includes a sloped landing 112. Seal ledge 110 and sloped landing 112 are designed to engage the inner surface of cavity walls 66 and seal flap 62 respectively to form a seal between top portion 102 and grommet 40 to inhibit or prevent fluids from flowing through opening 52 in lower intermediate section 44 of grommet 40. When grommet 40 is inserted into fueling cavity 36, fuel cavity 64 is positioned about top portion 102 of filler tube 100. The shape and size of fuel cavity 64 is about the same size and shape as top portion 102 so that a seal and rigid connection is formed between sealing structure 60 and top portion 102 of filler tube 100. Slope landing 112 is designed to engage the underside surface of flexible seal flap 62 to cause the seal flap to deflect slightly upwardly to ensure that a tight seal is formed between the bottom surface of seal 62 and slope landing 112. Once the side flange 46 is secured to welding housing 20, grommet 40 is secured into position to maintain the seal between the edge of fueling cavity 36 and top portion 102 of filler tube 100 and opening 52 in lower intermediate section 44 of grommet 40.

As shown in FIG. 2, the top of fuel gauge 120 is positioned inwardly from side portion 24 and below the top surface of top portion 22. In addition, opening extension 106 and opening cap 108 are also positioned inwardly from side portion 24 and below the top surface of top portion 22. This positioning of the fuel gauge and opening extension and opening cap reduces damage to such components and helps to ensure that the majority of spillage from fuel exiting opening 109 is contained in grommet 40. Opening extension 106 is spaced farther from side portion 24 than fuel gauge 120. This positioning also facilitates in ensuring that the majority of spillage is contained within the grommet. However, the position of the fuel gauge and opening extension can be reversed or positioned equally from side portion 24.

The invention has been described with reference to a preferred embodiment and alternates thereof. It is believed that many modifications, alterations to the embodiments disclosed readily suggest themselves, those skilled in the art upon reading and understanding the detailed description of the invention. It is intended to include all such modifications and alterations in so far as they come within the scope of the present invention.

What is claimed is:

1. A fueling assembly for a fuel tank of an engine driven welder, said engine driven welder including a housing having a top portion, at least one side portion, a fueling cavity, a grommet positioned in said fueling cavity, an engine and a fuel tank which supplies fuel to the engine; said fueling assembly including a filler tube having a bottom portion connected to said fuel tank and a top portion extending to at least closely adjacent to said fueling cavity in said housing, said top portion of said filler tube having an opening to receive fuel and a removable cap to close said opening, said grommet at least partially sealing said fueling cavity to inhibit fluids entering the interior of said housing, said grommet is a one piece structure having a side section and a lower intermediate section, said lower intermediate section including an opening to provide access to said filler tube opening, said grommet includes a sealing structure positioned in said opening in said lower intermediate section, said sealing structure including a flexible flap which at least partially engages said filler tube to form a seal with said filler tube, said sealing structure includes a filler cavity formed by a cavity wall extending downwardly from said opening in said lower intermediate section, said filler cavity at least partially receiving said filler tube, said cavity wall includes at least one support rib.

2. The fueling assembly as defined in claim 1, wherein said support rib extends to said opening in said lower intermediate section of said grommet.

3. A fueling assembly for a fuel tank of an engine driven welder, said engine driven welder including a housing having a top portion, at least one side portion, a fueling cavity, a grommet positioned in said fueling cavity, an engine and a fuel tank which supplies fuel to the engine; said fueling assembly including a filler tube having a bottom portion connected to said fuel tank and a top portion extending to at least closely adjacent to said fueling cavity in said housing, said top portion of said filler tube having an opening to receive fuel and a removable cap to close said opening, said grommet at least partially sealing said fueling cavity to inhibit fluids entering the interior of said housing, said grommet is a one piece structure having a side section and a lower intermediate section, said lower intermediate section including an opening to provide access to said filler tube opening, said side section having a substantially linear top portion formed into a U-shape and a curved base portion, said lower intermediate section having a curved portion.

4. The fueling assembly as defined in claim 3, wherein said base portion of said side section having a first radius of curvature, said curved portion of said lower intermediate section having a second radius of curvature, said first and second radius of curvatures being substantially the same.

5. A fueling assembly for a fuel tank of an engine driven welder, said engine driven welder including a housing having a top portion, at least one side portion, a fueling cavity, a grommet positioned in said fueling cavity, an engine and a fuel tank which supplies fuel to the engine; said fueling assembly including a filler tube having a bottom portion connected to said fuel tank and a top portion extending to at least closely adjacent to said fueling cavity in said housing, said top portion of said filler tube having an opening to receive fuel and a removable cap to close said opening, said grommet at least partially sealing said fueling cavity to inhibit fluids entering the interior of said housing, said grommet having a side section and a lower intermediate section, said lower intermediate section including an opening to provide access to said filler tube opening, said grommet further including a sealing structure positioned in said opening in said lower intermediate section that at least partially engages said filler tube to form a seal with said filler tube, said sealing structure including a filler cavity formed by a cavity wall extending downwardly from said opening in said lower intermediate section which includes at least one support rib.

6. The fueling assembly as defined in claim 5, wherein said support rib extends to said opening in said lower intermediate section of said grommet.

7. A fueling assembly for a fuel tank of an engine driven welder, said engine driven welder including a housing having a top portion, at least one side portion, a fueling cavity, a grommet positioned in said fueling cavity, an engine and a fuel tank which supplies fuel to the engine; said fueling assembly including a filler tube having a bottom portion connected to said fuel tank and a top portion extending to at least closely adjacent to said fueling cavity in said housing, said top portion of said filler tube having an opening to receive fuel and a removable cap to close said opening, said grommet at least partially sealing said fueling cavity to inhibit fluids entering the interior of said housing, said grommet having a side section, a lower intermediate section, and an opening to provide access to said filler tube opening, said opening being adjacent to but spaced above said lower intermediate section.

8. The fueling assembly as defined in claim 7, wherein said grommet includes a sealing structure positioned in said opening above said lower intermediate section, said sealing structure including a flexible flap which at least partially engages said filler tube to form a seal with said filler tube.

9. The fueling assembly as defined in claim 8, wherein said side section having a substantially linear top portion formed into a U-shape and a curved base portion, said lower intermediate section having a curved portion.

10. The fueling assembly as defined in claim 7, wherein a substantial portion of said lower intermediate section of said grommet slopes downwardly toward said side portion of said housing when mounted in said fueling cavity.

11. A fueling assembly for a fuel tank of an engine driven welder, said engine driven welder including a housing having a top portion, at least one side portion, a fueling cavity, a grommet positioned in said fueling cavity, an engine and a fuel tank which supplies fuel to the engine; said fueling assembly including a filler tube having a bottom portion connected to said fuel tank and a top portion extending to at least closely adjacent to said fueling cavity in said housing, said top portion of said filler tube having an opening to receive fuel and a removable cap to close said opening, said grommet at least partially sealing said fueling cavity to inhibit fluids entering the interior of said housing, said grommet having a side section and a lower intermediate section, said lower intermediate section including an opening to provide access to said filler tube opening, said side section having a substantially linear top portion formed into a U-shape and a curved base portion, said lower intermediate section being substantially arcuate.

12. A fueling assembly for a fuel tank of an engine driven welder, said engine driven welder including a housing having a top portion, at least one side portion, a fueling cavity, a grommet positioned in said fueling cavity, an engine and a fuel tank which supplies fuel to the engine; said fueling assembly including a filler tube having a bottom portion connected to said fuel tank and a top portion extending to at least closely adjacent to said fueling cavity in said housing, said top portion of said filler tube having an opening to receive fuel and a removable cap to close said opening, said grommet at least partially sealing said fueling cavity to inhibit fluids entering the interior of said housing, said grommet is a one piece structure having a side section and a lower intermediate section, said lower intermediate section including an opening to provide access to said filler tube opening, said grommet includes a positioning stub secured to the posterior side of said lower intermediate section, said positioning stub adapted to be inserted into an opening on a flange which extends inwardly from said side portion of said housing.

13. A fueling assembly for a fuel tank of an engine driven welder, said engine driven welder including a housing having a top portion, at least one side portion, a fueling cavity, a grommet positioned in said fueling cavity, an engine and a fuel tank which supplies fuel to the engine; said fueling assembly including a filler tube having a bottom portion connected to said fuel tank and a top portion extending to at least closely adjacent to said fueling cavity in said housing, said top portion of said filler tube having an opening to receive fuel and a removable cap to close said opening, said grommet at least partially sealing said fueling cavity to inhibit fluids entering the interior of said housing, said grommet is a one piece structure having a side section and a lower intermediate section, said lower intermediate section including an opening to provide access to said filler tube opening, a substantial portion of said lower intermediate section of said grommet slopes downwardly toward said side portion of said housing when mounted in said fueling cavity.

* * * * *